United States Patent
Jegou et al.

(10) Patent No.: US 11,237,293 B2
(45) Date of Patent: Feb. 1, 2022

(54) METHOD AND DETECTOR FOR INSPECTION SYSTEM

(71) Applicant: Smiths Detection France S.A.S., Vitry sur Seine (FR)

(72) Inventors: Guillaume Jegou, Vitry sur Seine (FR); Jean-Michel Faugier, Vitry sur Seine (FR)

(73) Assignee: SMITHS HEIMANN SAS, Vitry sur Seine (FR)

( * ) Notice: Subject to any disclaimer, the term of this patent is extended or adjusted under 35 U.S.C. 154(b) by 17 days.

(21) Appl. No.: 16/493,820

(22) PCT Filed: Mar. 9, 2018

(86) PCT No.: PCT/GB2018/050616
§ 371 (c)(1),
(2) Date: Sep. 13, 2019

(87) PCT Pub. No.: WO2018/167466
PCT Pub. Date: Sep. 20, 2018

(65) Prior Publication Data
US 2020/0132878 A1    Apr. 30, 2020

(30) Foreign Application Priority Data

Mar. 15, 2017   (GB) ...................................... 1704123

(51) Int. Cl.
*G01V 5/00*     (2006.01)
*G01T 1/20*     (2006.01)

(52) U.S. Cl.
CPC .......... *G01V 5/0016* (2013.01); *G01T 1/2018* (2013.01)

(58) Field of Classification Search
CPC .............. G01V 5/0016; G01V 5/0025; G01V 5/0008; G01V 5/0041; G01T 1/2018; G01T 1/2006; G01T 1/203
See application file for complete search history.

(56) References Cited

U.S. PATENT DOCUMENTS

| | | |
|---|---|---|
| 5,831,269 A | 11/1998 | Nakamura et al. |
| 2006/0067472 A1* | 3/2006 | Possin ..................... G01T 1/202 378/98.9 |

(Continued)

FOREIGN PATENT DOCUMENTS

| | | |
|---|---|---|
| DE | 19711927 A1 | 9/1998 |
| DE | 10224227 A1 | 12/2003 |

OTHER PUBLICATIONS

International Search report for PCT/GB2018/050616, dated Jun. 26, 2018, 3 Pages.

*Primary Examiner* — David P Porta
*Assistant Examiner* — Mamadou Faye
(74) *Attorney, Agent, or Firm* — Armstrong Teasdale LLP

(57) ABSTRACT

In one embodiment, there is provided detector for an inspection system, including at least one first scintillator configured to, in response to interaction with a pulse of inspection radiation, re-emit first light in a first wavelength domain, at least one second scintillator configured to, in response to interaction with the pulse of inspection radiation, re-emit second light in a second wavelength domain different from the first wavelength domain, and at least one first sensor configured to measure the first light and the second light.

18 Claims, 6 Drawing Sheets

(56) References Cited

U.S. PATENT DOCUMENTS

| | | | |
|---|---|---|---|
| 2007/0158573 A1* | 7/2007 | Deych | G01T 1/2018 250/370.11 |
| 2010/0034353 A1* | 2/2010 | Kravis | G01V 5/0016 378/87 |
| 2011/0096892 A1 | 4/2011 | Forthmann et al. | |
| 2011/0216878 A1* | 9/2011 | Roessl | G01T 1/1647 378/4 |
| 2013/0200266 A1* | 8/2013 | Perna | G01T 1/2006 250/366 |
| 2016/0084963 A1* | 3/2016 | Laurence | G01T 1/2985 250/362 |
| 2016/0274247 A1* | 9/2016 | Kobayashi | G01T 1/208 |
| 2017/0131428 A1* | 5/2017 | Langeveld | G01V 5/0041 |

* cited by examiner

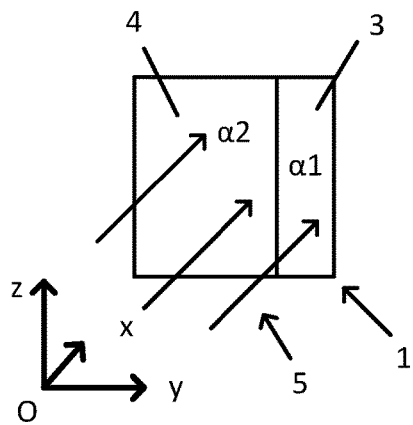
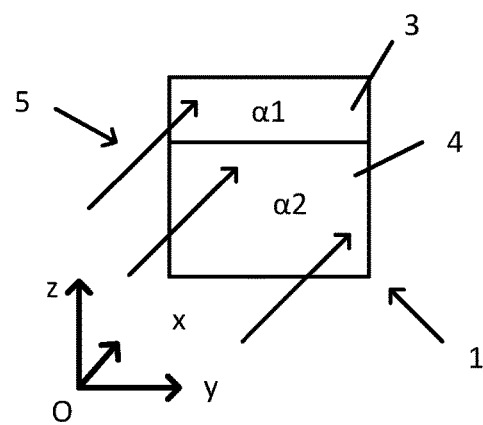
Figure 3A
Figure 3B
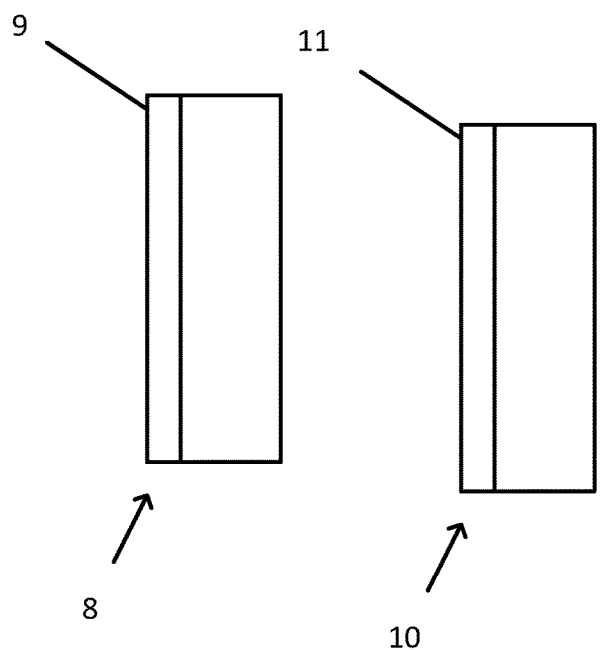
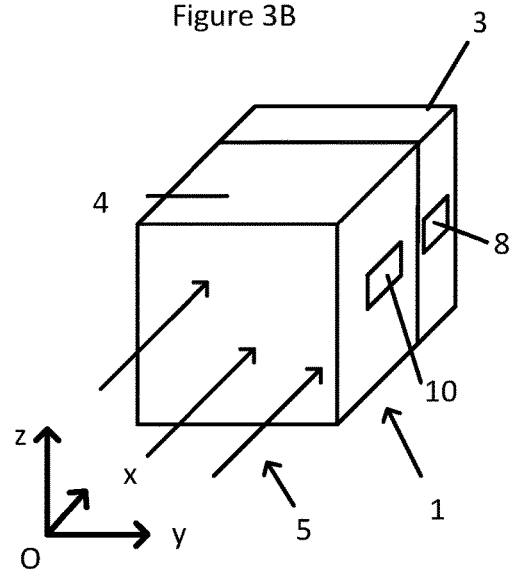
Figure 3C
Figure 4A  Figure 4B

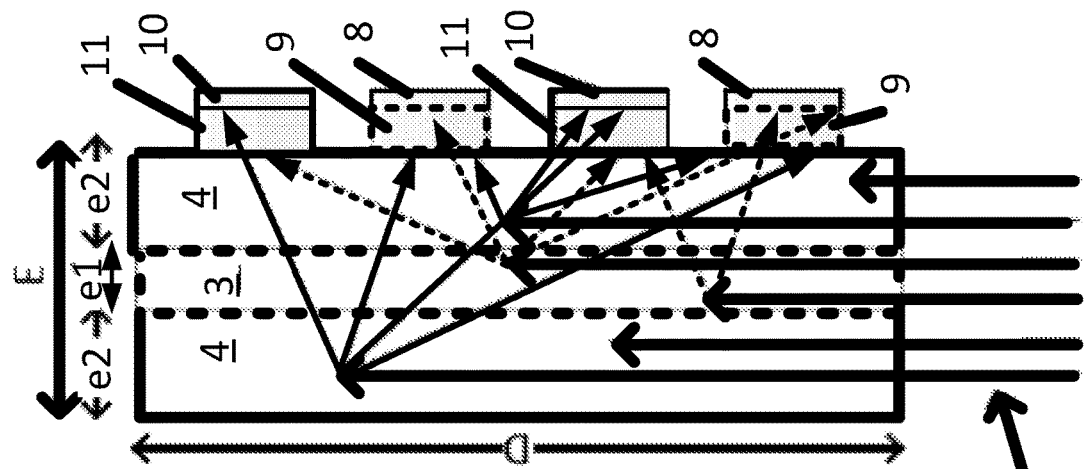
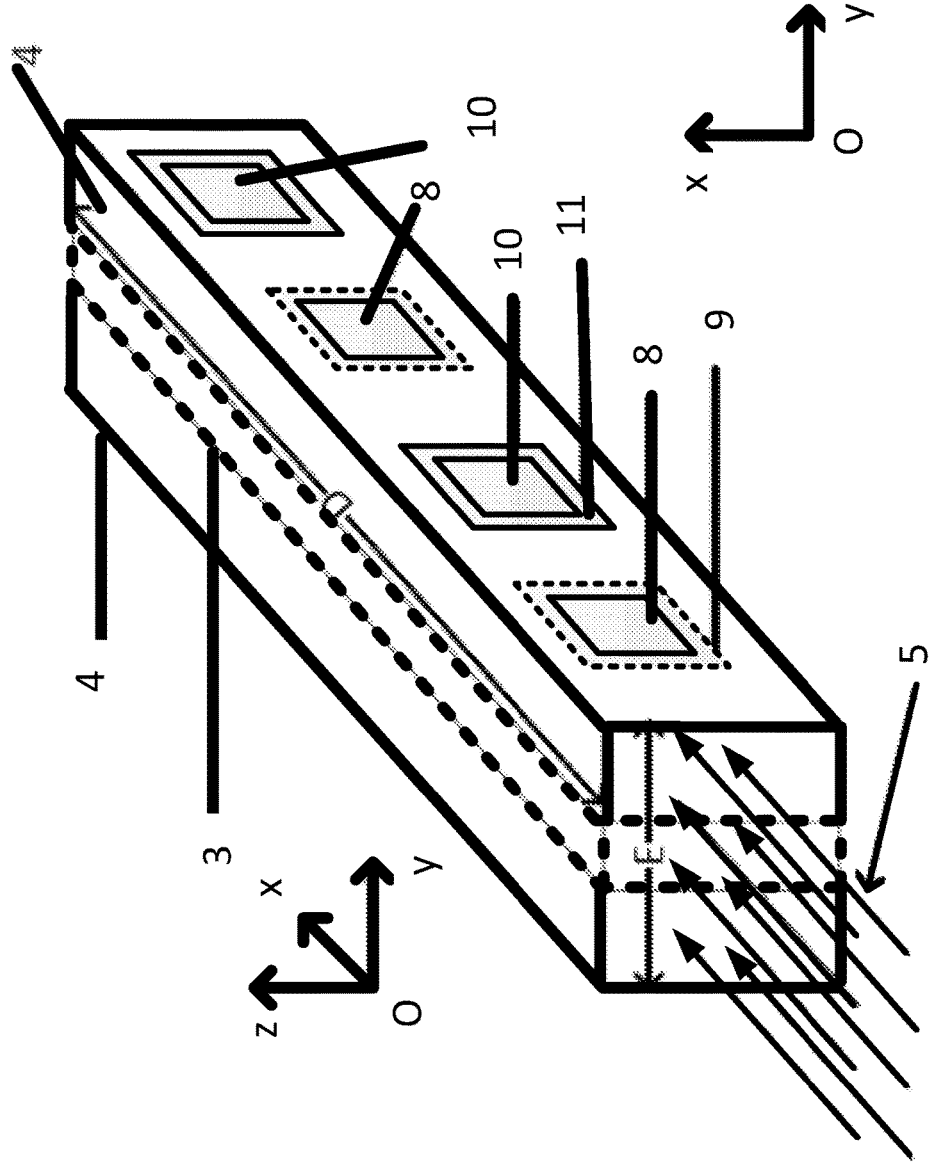
Figure 5A
Figure 5B

METHOD AND DETECTOR FOR INSPECTION SYSTEM

CROSS REFERENCE TO RELATED APPLICATIONS

This patent application is a National Stage Entry of PCT/GB2018/050616 filed on Mar. 9, 2018, which claims priority to GB Application No. 1704123.7 filed on Mar. 15, 2017, the disclosures of which are hereby incorporated by reference herein in their entirety as part of the present application.

FIELD OF INVENTION

The present disclosure relates to scanning apparatus and methods and to the detection of objects concealed in cargo, for example by imaging.

BACKGROUND

Inspection systems use inspection radiation for inspecting cargo (such as a vehicle), for example to detect hidden objects (such as weapons or dangerous material).

Detectors used in the known inspection systems usually generate a relatively large signal so that an image derived from the signal may have a satisfying contrast. However resolution may not always be optimal.

Aspects of the present disclosure address some of the above issues.

SUMMARY OF INVENTION

Aspects and embodiments of the present disclosure, such as those set out in the appended claims, aim to address the above mentioned technical problem, and related technical problems.

PRESENTATION OF THE FIGURES

Figures 1A, 1B:
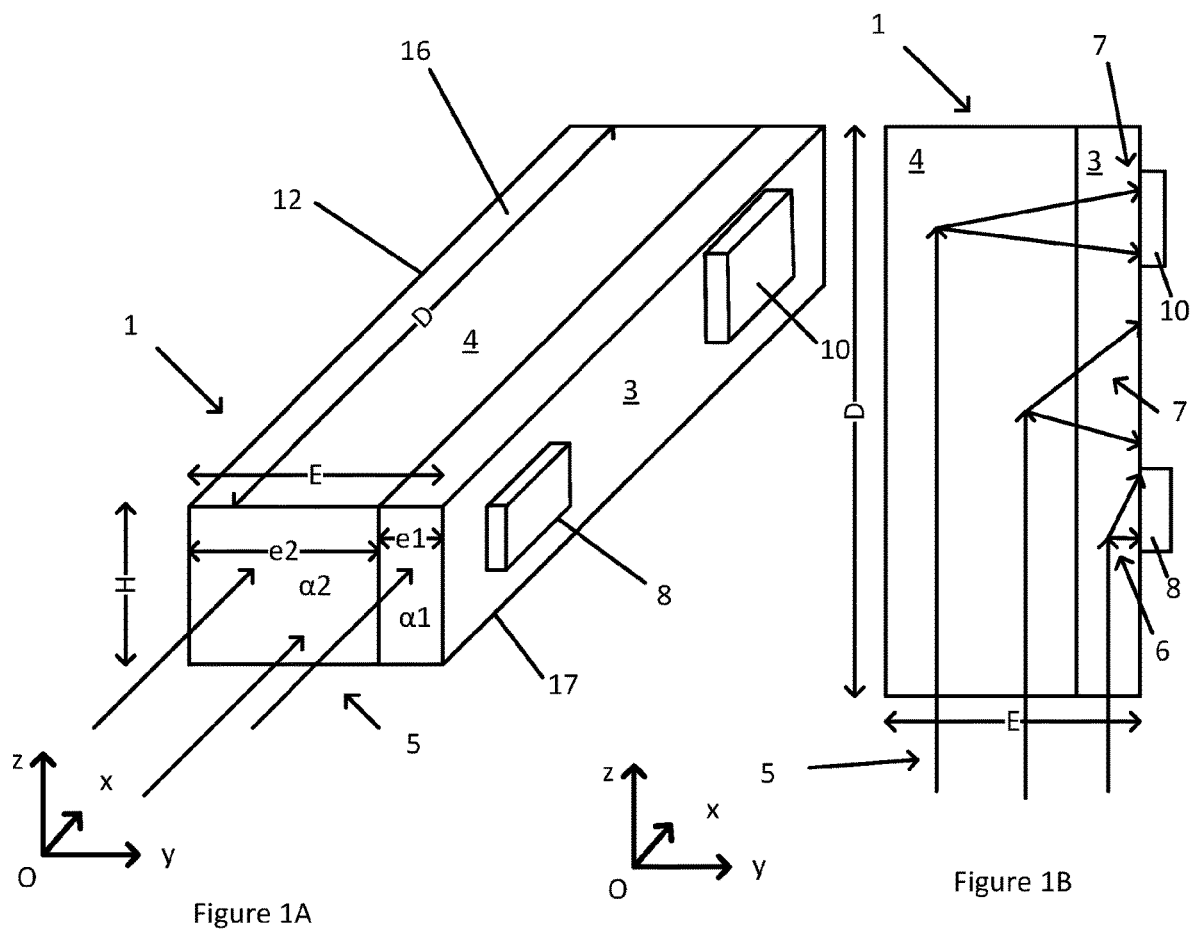
Figure 2:
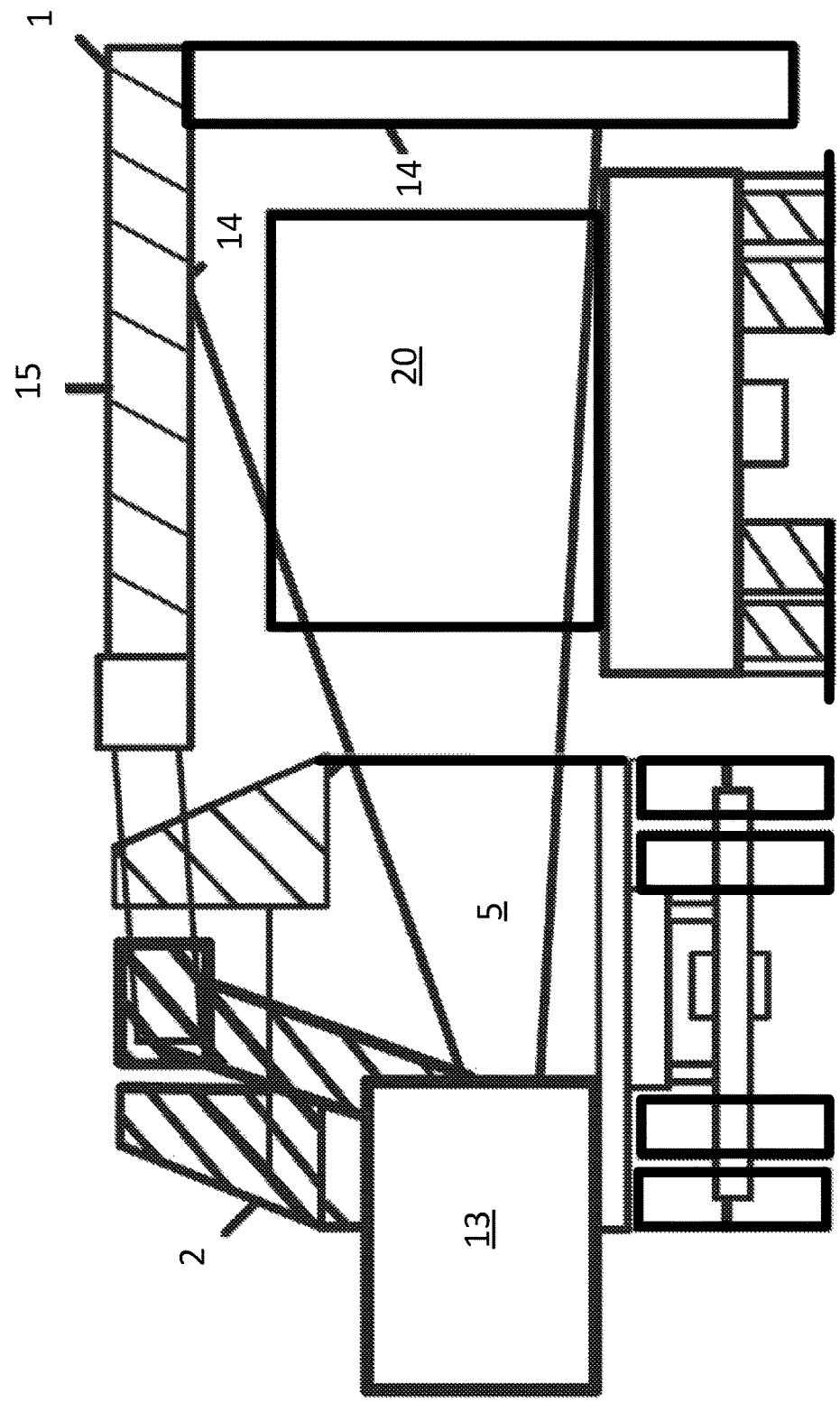
Figure 6:
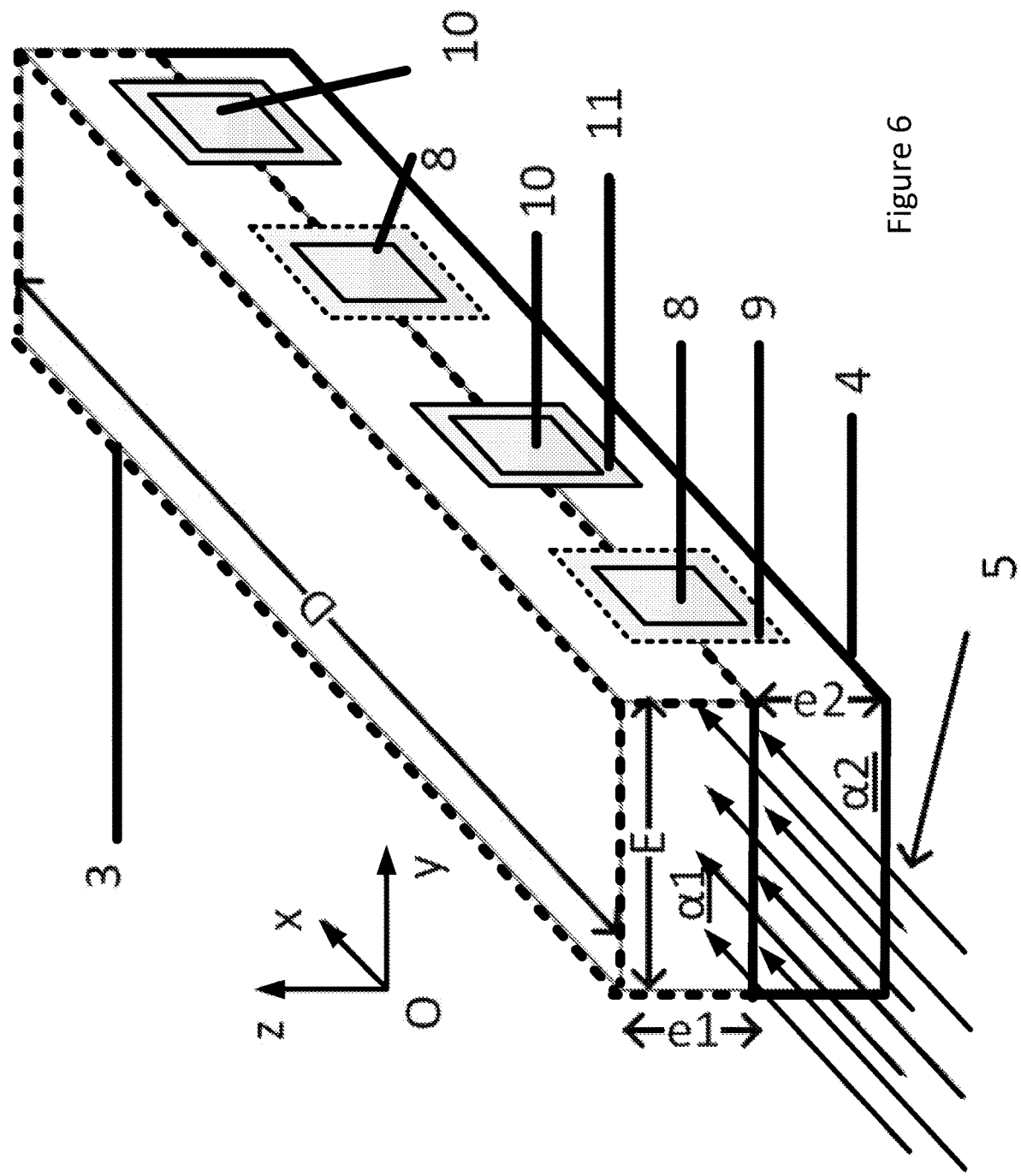
Figure 7:
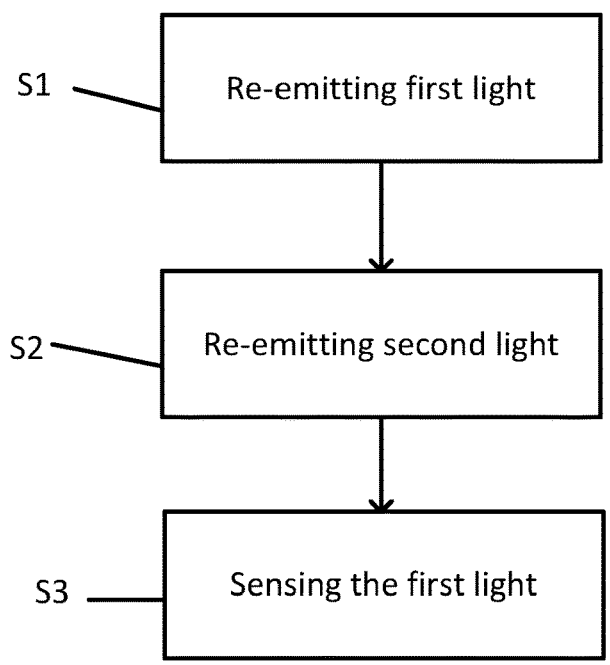
Figure 8:
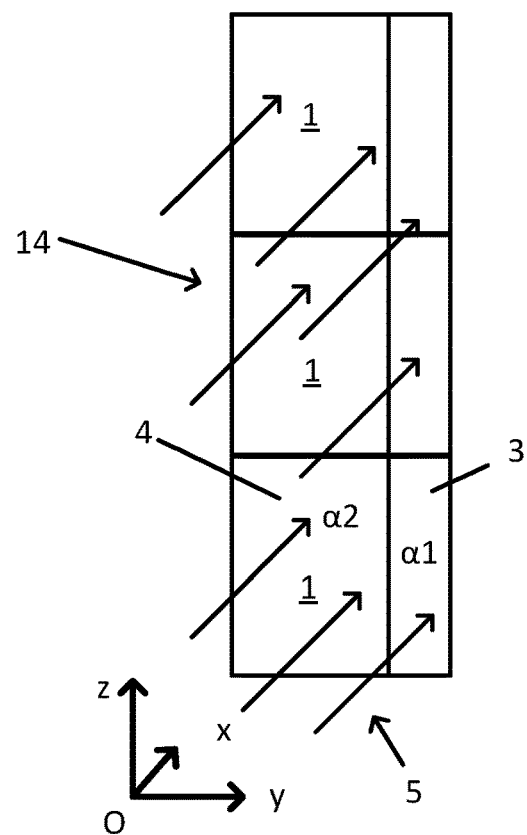

Embodiments of the disclosure will now be described, by way of example only, with reference to the accompanying drawings, in which:

FIG. 1A shows an example detector, in a perspective view;
FIG. 1B shows the example detector of FIG. 1A, in a top view;
FIG. 2 shows an example system for inspection, viewed from a rear side;
FIG. 3A shows an example detector, in a front view;
FIG. 3B shows another example detector, in a front view;
FIG. 3C shows an example detector, in a perspective view;
FIG. 4A shows an example first sensor, in a side view;
FIG. 4B shows an example second sensor, in a side view;
FIG. 5A shows an example detector, in a perspective view;
FIG. 5B shows the example detector of FIG. 5A, in a top view;
FIG. 6 shows an example detector, in a perspective view;
FIG. 7 shows a flowchart that illustrates an example method according to the disclosure; and
FIG. 8 shows an example detection array, in a front view.

In the drawings, like elements are referred to by the same numerical references.

Description of Example Embodiments

Overview

FIGS. 1A and 1B show a schematic illustration of a detector 1. As illustrated by FIG. 2, the detector 1 is suitable for being used with an inspection system 2, e.g. for inspection of cargo 20.

The detector 1 includes at least one first scintillator 3 configured to, in response to interaction with a pulse 5 of inspection radiation, re-emit first light 6 in a first wavelength domain.

The inspection radiation may include X-ray radiation as a non-limiting example. In some examples, the inspection may be performed by transmission of successive inspection radiation pulses through the cargo 20 to be inspected.

The detector 1 includes at least one second scintillator 4 configured to, in response to interaction with the pulse 5 of inspection radiation, re-emit second light 7 in a second wavelength domain different from the first wavelength domain.

The detector 1 further includes at least one first sensor 8 configured to measure (e.g. sense and/or acquire) the first light 6 and not the second light 7 (e.g. the first sensor 8 is configured to be insensitive to and/or not acquire the second light 7).

Given that the first light 6 produced by the first scintillator 3 and the second light 7 produced by the second scintillator 4 are different, and that the first sensor 8 measures the first light only, the detector 1 according to the present disclosure enables determining energy deposition associated with the pulse 5 at the level of the first scintillator 3 only. As illustrated in FIGS. 1A and 3A, the first scintillator 3 may have an area $\alpha 1$ exposed to the pulse 5 which is a fraction of the total area of the detector 1 exposed to the pulse 5.

As illustrated in FIGS. 1A and 3A, when the first scintillator 3 and the second scintillator 4 are positioned adjacent along a direction (Oy) transverse to a direction (Ox) of propagation of the pulses 5, a resolution of an image obtained using a signal associated with the first scintillator 3 and the first sensor 8 may be increased in the (Oy) direction. As illustrated in FIGS. 3B and 6, when the first scintillator 3 and the second scintillator 4 are positioned adjacent along a direction (Oz) transverse to the direction (Ox) of propagation of the pulses 5, a resolution of an image obtained using a signal associated with the first scintillator 3 and the first sensor 8 may be increased in the (Oz) direction.

In the example of FIGS. 1A, 1B, 5A, 5B and 6 the detector 1 further comprises at least one second sensor 10 configured to measure (e.g. sense and/or acquire) at least the second light 7.

As illustrated in FIG. 6, the second scintillator 4 may have an area a2 exposed to the pulse 5 which is equal to $\alpha 1$. A resolution of an image obtained using a signal associated with the second scintillator 4 and the second sensor 10 may be increased in the (Oz) direction.

As illustrated in FIGS. 1A, 1B, 3A and 3B, the second scintillator 4 may have an area a2 exposed to the pulse 5 which is greater than $\alpha 1$. The signal associated with the second scintillator 4 and the second sensor 10 will generate a better contrast compared to the signal associated with the first scintillator 3 and the first sensor 8, because the area $\alpha 2$ is larger than area $\alpha 1$ and more energy from the pulse 5 is deposited in the second scintillator 4.

In some examples, the at least one second sensor 10 is configured not to measure (e.g. to be insensitive to) the first light 6. In that case the signal associated with the second scintillator 4 and the at least one second sensor 10 may be proportional to the energy deposition on the area α2. However, in some examples, the at least one second sensor 10 may be configured to measure both the first light 6 and the second light 7. In that case the signal associated with the at least one second sensor 10 may thus be proportional to the energy deposition in the whole detector (i.e. both the areas α1 and α2).

As illustrated in FIG. 3C, when the first scintillator 3 and the second scintillator 4 are positioned adjacent along the direction (Ox) of propagation of the pulses 5, information about a material of the cargo may be derived from a signal associated with the first scintillator 3 and the first sensor 8 on the one hand, and the second scintillator 4 and the second sensor 10 on the other hand, as some material may have specificities on the first scintillator 3 and the first sensor 8 on the one hand and the second scintillator 4 and the second sensor 10 on the other hand.

In some examples, the at least one first sensor 8 and the at least one second sensor 10 have each their own electronic channel.

Detailed Description of Example Embodiments

In the example illustrated by FIG. 2, the inspection system 2 may be mobile and may be transported from a location to another location. In some examples the system 2 may include an automotive vehicle. The inspection system 2 may be configured to inspect the cargo 20 by transmission of successive radiation pulses 5, emitted from an inspection radiation source 13 to at least one detection array 14, through the cargo 20. In some examples, the detection array 14 may comprise a detection line 14 including a plurality of detectors 1 according to the disclosure, as illustrated in FIG. 8. The array 14 of FIG. 8 includes only three detectors 1. However it should be understood that the array 14 may include any number of detectors 1, such as up to 1200 detectors or more as a non-limiting example.

FIG. 2 illustrates that the cargo 20 may be a trailer and/or a boot of a vehicle such as a truck, a van and/or a car, and/or may be a shipping container.

The system 2 may further include other types of detectors, such as optional gamma and/or neutrons detectors, e.g., adapted to detect the presence of radioactive gamma and/or neutrons emitting materials within the cargo 20, e.g., simultaneously to the X-ray inspection. In the example illustrated in FIG. 2, the system 2 may also include an electro-hydraulic boom 15 which can operate in a retracted position in a transport mode (not illustrated in the Figures) and in an inspection position (FIG. 2). The boom 15 may be operated by hydraulic activators (such as hydraulic cylinders).

In the example illustrated in FIG. 4A, the at least one first sensor 8 includes a first filter 9 configured to let through the first wavelength domain and inhibit (e.g. block or at least attenuate) the second wavelength domain.

In the example illustrated in FIG. 4B, the at least one second sensor 10 includes a second filter 11 configured to let through the second wavelength domain and inhibit (e.g. block or at least attenuate) the first wavelength domain.

As already stated, the at least one second sensor 10 need not being configured not to measure (e.g. configured to be insensitive to) the first light 6, and, in some examples, the at least one second sensor 10 may be sensitive to both the first light 6 and the second light 7. The fact that the at least one second sensor 10 may be sensitive to both the first light 6 and the second light 7 means that the signal associated with the at least one second sensor 10 is greater than that of a sensor sensitive only to the second light 7. This means that the penetration and/or contrast associated with the second sensor 10 is greater.

In some examples, the at least one first sensor 8 and/or the at least one second sensor 10 includes a photodiode.

In some examples, the first scintillator 3 includes an organic and/or an inorganic material. Alternatively or additionally, the second scintillator 4 includes an organic and/or an inorganic material. Some non-limiting examples of organic material include:

BC400, which produces light in the blue wavelength domain, and/or

BC428, which produces light in the green wavelength domain, and/or

BC430, which produces light in the red wavelength domain.

As non-limiting examples, each of the at least one first scintillator 3 is configured to re-emit the first light 6 in the red first wavelength domain, and each of the at least one second scintillator 4 is configured to re-emit the second light 7 in the blue second wavelength domain. Other wavelength domains are envisaged.

Alternatively or additionally, the first scintillator 3 may include one or more wavelength shifters for re-emitting the first light in the first wavelength domain. Alternatively or additionally, the second scintillator 4 may include one or more wavelength shifters for re-emitting the second light in the second wavelength domain different from the first wavelength domain.

A dimension Δ of the detector in a direction transversal to a direction of extension of a depth of the first scintillator and/or of the second scintillator extending in a direction parallel to a plane of propagation of the inspection radiation may be such that:

$1\ mm \leq \Delta \leq 5\ mm.$

As illustrated in FIGS. 1A and 1B, a dimension Δ=E of the detector 1 in a direction (Oy) transversal to a direction (Ox) of extension of a depth D of the first scintillator 3 and/or of the second scintillator 4 extending in a direction (Ox) parallel to a plane of propagation of the inspection radiation 5 is such that:

$1\ mm \leq E \leq 5\ mm.$

As illustrated in FIG. 1A, a dimension Δ=H of the detector 1 in a direction (Oz) transversal to the direction (Ox) of extension of the depth D of the first scintillator 3 and/or of the second scintillator 4 extending in the direction (Ox) parallel to a plane of propagation of the inspection radiation 5 is such that:

$1\ mm \leq H \leq 5\ mm.$

In some examples, the detector 1 may have a square shape in a plane (yOz) transversal to the direction (Ox) of extension of the depth D of the first scintillator 3 and/or of the second scintillator 4, i.e.

$E = H$

In some examples, D may be such that $10\ mm \leq D \leq 100\ mm.$

In some examples, the at least one first sensor 8 and/or the at least one second sensor 10 are located on at least one side of the at least one first scintillator 3 and/or the at least one second scintillator 4, along the depth D of the first scintillator 3 and/or along the depth D of the second scintillator 4.

As illustrated in FIGS. 1A and 1B, the at least one first sensor 8 and the at least one second sensor 10 are located on a side of the at least one first scintillator 3, along the depth D of the first scintillator 3. It should be understood that the device 1 illustrated in FIGS. 1A and 1B may comprise at least one first sensor and/or at least one second sensor located on a side 12 of the at least one second scintillator 4, along the depth D of the second scintillator 4, or on an upper face 16 or a lower face 17.

As illustrated in FIGS. 1A and 1B, the first scintillator 3 is located adjacent the second scintillator 4. A dimension e1 of the first scintillator 3 in the direction (Oy) transversal to the depth D of the first scintillator 3 and the second scintillator 4 may be such that:

0.5 mm≤e1<3.5 mm.

In some examples, e1 may be equal to about 1 mm.

A dimension e2 of the second scintillator 4 in the direction (Oy) transversal to the depth D of the first scintillator 3 and of the second scintillator 4 may be such that:

1 mm≤e2≤4.5 mm, and e2≥e1.

In some examples, e2 may be equal to about 4 mm.

The fact that e2 is greater than e1 means that the signal associated with the second scintillator 4 and the second sensor 10 is greater than the signal associated with the first scintillator 3 and the first sensor 8. This means that the penetration and/or contrast associated with the second scintillator 4 and the second sensor 10 is greater than the penetration and/or contrast associated with the first scintillator 3 and the first sensor 8.

The signal associated with the first scintillator 3 and detected by the at least one first sensor 8 is proportional to the energy deposition in the first scintillator 3 only. However the fact that e1 is smaller than e2 means that the resolution associated with the first scintillator 3 and the first sensor 8 is greater than the resolution associated with the second scintillator 4 and the second sensor 10.

In the example of FIGS. 5A and 5B, the detector 1 includes one first scintillator 3 located between two second scintillators 4. The dimension e1 of the first scintillator 3 in the direction (Oy) transversal to the depth D of the first scintillator 3 and of the second scintillators 4 is such that:

0.5 mm≤e1≤3.5 mm.

In some examples, e1 may be equal to about 1 mm.

The dimension e2 of each of the second scintillators 4 in the direction (Oy) transversal to the depth D of the first scintillator 3 and the second scintillators 4 is such that:

1 mm≤e2≤4 mm.

In some examples, e2 may be equal to about 2 mm. The dimension of the two second scintillators 4 in the direction (Oy) transversal to the depth D of the first scintillator 3 and the second scintillators is thus equal to 2×e2.

The fact that 2×e2 is greater than e1 means that the signal associated with the second scintillators 4 and the second sensors 10 is greater than the signal associated with the first scintillator 3 and the first sensors 8. This means that the penetration and/or contrast associated with the second scintillators 4 and the second sensors 8 is greater than the penetration and/or contrast associated with the first scintillator 3 and the first sensors 8. The fact that e1 is smaller than 2×e2 means that the resolution associated with the first scintillator 3 and the first sensors 8 is greater than the resolution associated with the second scintillators 4 and the second sensors 10.

In the example illustrated in FIG. 6, the detector 1 includes one first scintillator 3 located adjacent one second scintillator 4, in the direction (Oz) transversal to the depth D of the first scintillator 3 and of the second scintillator 4. A dimension e1 of the first scintillator 3 in the direction (Oz) transversal to the depth D of the first scintillator 3 and of the second scintillator 4 is such that:

0.5 mm≤e1≤3.5 mm.

In some examples, e1 may be equal to about 2.5 mm.

A dimension e2 of the second scintillator 4 in the direction (Oz) transversal to the depth D of the first scintillator 3 and of the second scintillator 4 is such that:

1 mm≤e2≤4 mm.

In some examples, e2 may be equal to about 2.5 mm.

In the examples of FIGS. 1A, 1B, 3A, 3B, 3C, 5A, 5B and 6, the at least one first scintillator 3 has a refractive index, and the at least one second scintillator 4 has a refractive index substantially equal to the refractive index of the first scintillator. Both first light 6 and second light 7 may then exit the first scintillator 3 and the second scintillator 4 to reach the first and second sensors 8 and 10.

The successive first radiation pulses 5 may include at least one of X-ray radiation and/or gamma radiation and/or neutron radiation. As illustrated in FIG. 7, a method according to the disclosure may include:

re-emitting, at S1, first light in a first wavelength domain, in response to interaction with a pulse of inspection radiation;

re-emitting, at S2, second light in a second wavelength domain different from the first wavelength domain, in response to interaction with the pulse of inspection radiation; and sensing, at S3, the first light and not the second light.

In some examples, the method described above may be performed, at least partly, on a detection device as described above.

Variations and Modifications

A first light domain and a second light domain have been disclosed. It should be appreciated that embodiments of the disclosure may, additionally or alternatively, use the disclosed light selection to separate an undesirable afterglow from the desired signal to measure (the afterglow may correspond to an undesirable signal which can last several seconds and may deteriorate an obtained image by generating «bleeding» in the image). Other variations and modifications will be apparent to the skilled in the art in the context of the present disclosure, and various features described above may have advantages with or without other features described above.

The energy of the X-rays may be between 1 MeV and 15 MeV, and the dose may be comprised between 2 mGy and 20 Gy (Gray). In the example illustrated by FIG. 2, the power of the X-ray generator may be e.g., between 500 keV and 9.0 MeV, typically e.g., 2 MeV, 3.5 MeV, 4 MeV, or 6 MeV, for a steel penetration capacity e.g., between 150 mm to 350 mm, typically e.g., 200 mm (7.9 in). In the example illustrated by FIG. 2, the dose may be e.g., between 20 mGy and 50 mGy.

The system may also be static with respect to the ground. In such examples, the power of the X-ray generator may be e.g., between 4 MeV and 10 MeV, typically e.g., 9 MeV, for a steel penetration capacity e.g., between 300 mm to 450 mm, typically e.g., 410 mm (16.1 in). The dose may be 17 Gy.

It is understood that the inspection radiation generator may include sources of other radiation, such as neutrons. The inspection radiation generator may also include sources which are not adapted to be activated by a power supply, such as radioactive sources, such as using Co60 or Cs137.

As one possibility, there is provided a computer program, computer program product, or computer readable medium, comprising computer program instructions to cause a programmable computer to carry out any one or more of the methods described herein. In example implementations, at least some portions of the activities related to the device herein may be implemented in software. It is appreciated that software components of the present disclosure may, if desired, be implemented in ROM (read only memory) form. The software components may, generally, be implemented in hardware, if desired, using conventional techniques.

In some examples, components of the detector 1 may use specialized applications and hardware.

In some examples, one or more memory elements can store data used for the operations described herein. This includes the memory element being able to store software, logic, code, or processor instructions that are executed to carry out the activities described in the disclosure.

A processor can execute any type of instructions associated with the data to achieve the operations detailed herein in the disclosure. In one example, the processor could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

The above embodiments are to be understood as illustrative examples, and further embodiments are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. A detector for an inspection system, comprising:
   at least one first scintillator configured to, in response to interaction with a pulse of inspection radiation, re-emit first light in a first wavelength domain;
   at least one second scintillator configured to, in response to interaction with the pulse of inspection radiation, re-emit second light in a second wavelength domain different from the first wavelength domain, wherein the at least one first scintillator is adjacent to the at least one second scintillator along a direction transverse to a direction of propagation of the inspection radiation; and
   at least one first sensor configured to measure the first light and not the second light, wherein the at least one first scintillator is positioned between the at least one second scintillator and the at least one first sensor along the direction transverse to the direction of propagation of the inspection radiation.

2. The detector of claim 1, wherein the at least one first sensor comprises a first filter configured to let through the first wavelength domain and inhibit the second wavelength domain.

3. The detector of claim 1, further comprising:
   at least one second sensor configured to measure at least the second light.

4. The detector of claim 3, wherein the at least one second sensor is configured not to measure the first light.

5. The detector of claim 4, wherein the at least one second sensor comprises a second filter configured to let through the second wavelength domain and inhibit the first wavelength domain.

6. The detector of claim 1, wherein at least one of the at least one first sensor and the at least one second sensor comprises a photodiode.

7. The detector of claim 1, wherein at least one of:
   the first scintillator comprises at least one of an organic and an inorganic material; and
   the second scintillator comprises at least one of an organic and an inorganic material.

8. The detector of claim 1, wherein at least one of the first scintillator and the second scintillator comprises one or more wavelength shifters.

9. The detector of claim 1, wherein a dimension $\Delta$ of the detector in a direction transverse to a direction of extension of a depth of at least one of the first scintillator and the second scintillator extending in a direction parallel to a plane of propagation of the inspection radiation is such that:

$$1\ mm \leq \Delta \leq 5\ mm.$$

10. The detector of claim 1, wherein the at least one second scintillator is located adjacent the at least one first scintillator, the detector having a square shape in a plane transverse to a direction of extension of the depth of at least one of the first scintillator and the second scintillator.

11. The detector of claim 1, wherein the at least one first sensor and the at least one second sensor are located on at least one side of at least one of the at least one first scintillator and the at least one second scintillator, along a depth of at least one of the first scintillator the second scintillator, the depth of at least one of the first scintillator and the second scintillator extending in a direction parallel to a plane of propagation of the inspection radiation.

12. The detector of claim 1, comprising one first scintillator located between two second scintillators, wherein:
   a dimension e1 of the first scintillator in a direction transverse to the depth of at least one of the first scintillator and the second scintillators is such that:

$$0.5\ mm \leq e1 \leq 3.5\ mm,\ and$$

a dimension e2 of each of the second scintillators in the direction transverse to the depth of at least one of the first scintillator and the second scintillators is such that:

$$1\ mm \leq e2 \leq 4.5\ mm.$$

13. The detector of claim 1, comprising one first scintillator located adjacent one second scintillator, wherein:
   a dimension e1 of the first scintillator in a direction transverse to the depth of at least one of the first scintillator and the second scintillator is such that:

$$0.5\ mm \leq e1 \leq 3.5\ mm,$$

a dimension e2 of the second scintillator in the direction transverse to the depth of at least one of the first scintillator and the second scintillator is such that:

$$1 \text{ mm} \leq e2 \leq 4 \text{ mm, and}$$

$$e2 \geq e1.$$

14. The detector of claim 1, wherein the at least one first scintillator has a refractive index and the at least one second scintillator has a refractive index substantially equal to the refractive index of the first scintillator.

15. The detector of claim 1, wherein:
each of the at least one first scintillator is configured to re-emit the first light in the red first wavelength domain, and
each of the at least one second scintillator is configured to re-emit the second light in the blue second wavelength domain.

16. A detection array for inspection of cargo, comprising:
a plurality of detectors according to claim 1.

17. A method comprising:
re-emitting, from a first scintillator, first light in a first wavelength domain, in response to interaction with a pulse of inspection radiation;
re-emitting, from a second scintillator, second light in a second wavelength domain different from the first wavelength domain, in response to interaction with the pulse of inspection radiation, wherein the first scintillator is adjacent to the second scintillator along a direction transverse to a direction of propagation of the pulse of inspection radiation; and
sensing the first light and not the second light using a first sensor, wherein the first scintillator is positioned between the second scintillator and the first sensor along the direction transverse to the direction of propagation of the inspection radiation.

18. A computer program product comprising program instructions to program a processor to carry out a method according to claim 17.

\* \* \* \* \*